Figure 1:
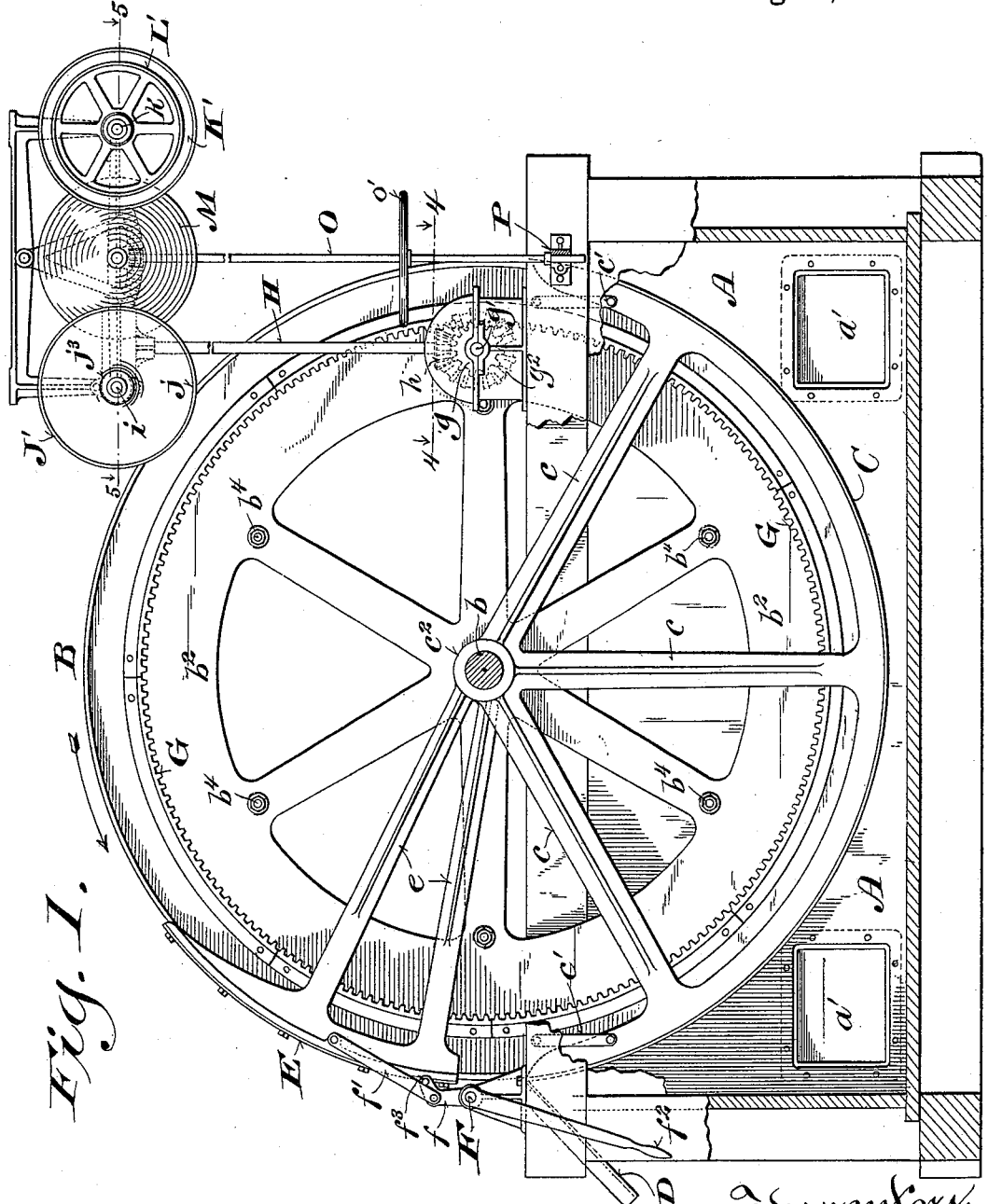

(No Model.) 4 Sheets—Sheet 1.

B. V. NORDBERG & A. UIHLEIN.
BOTTLE WASHER.

No. 587,397. Patented Aug. 3, 1897.

Witnesses:
Geo. W. Young.
Chas. L. Goss.

Inventors:
Bruno V. Nordberg
Alfred Uihlein,
By Winkler Flanders Smith Bottum & Vilas
Attorneys.

(No Model.) 4 Sheets—Sheet 2.
B. V. NORDBERG & A. UIHLEIN.
BOTTLE WASHER.
No. 587,397. Patented Aug. 3, 1897.
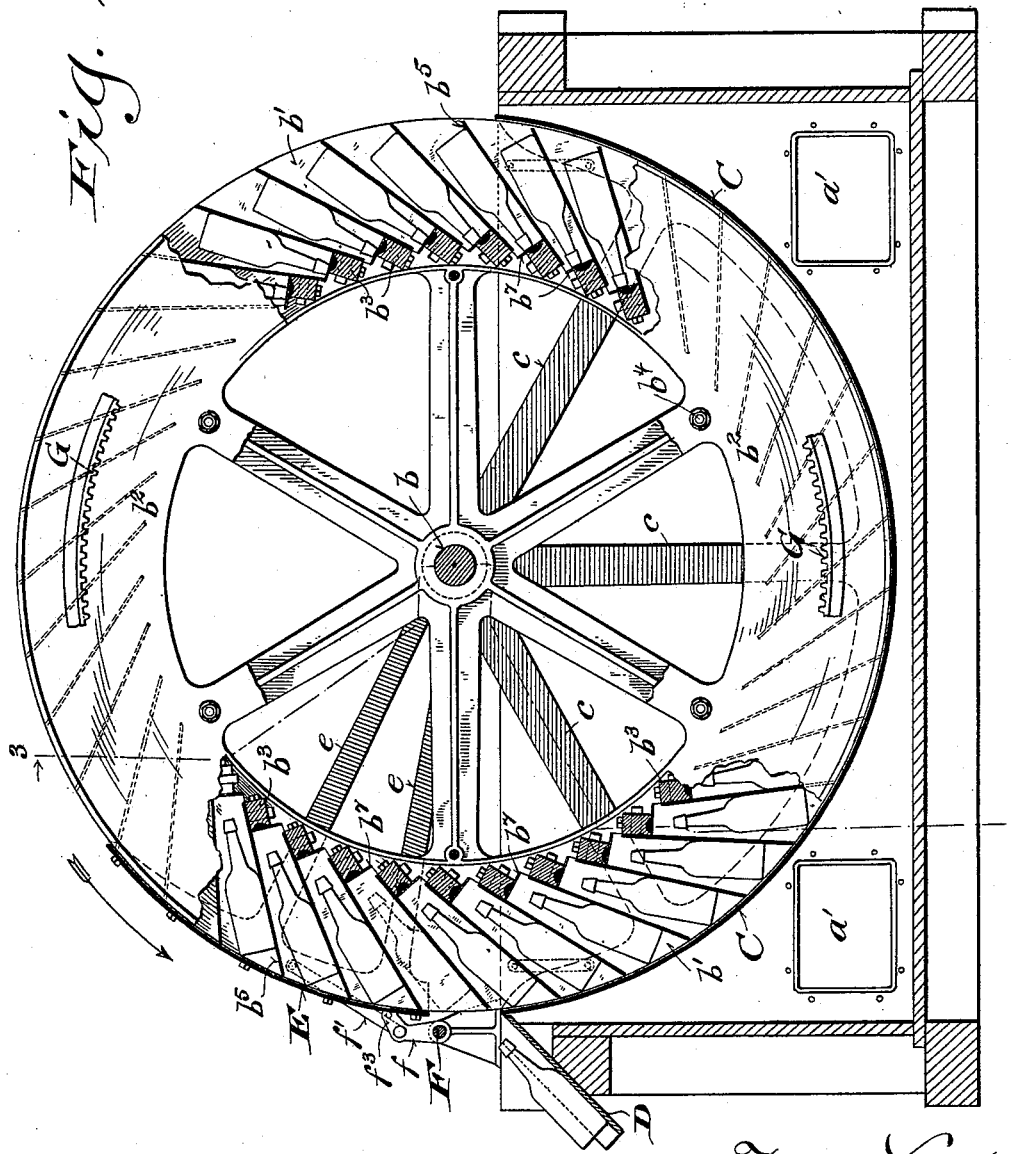

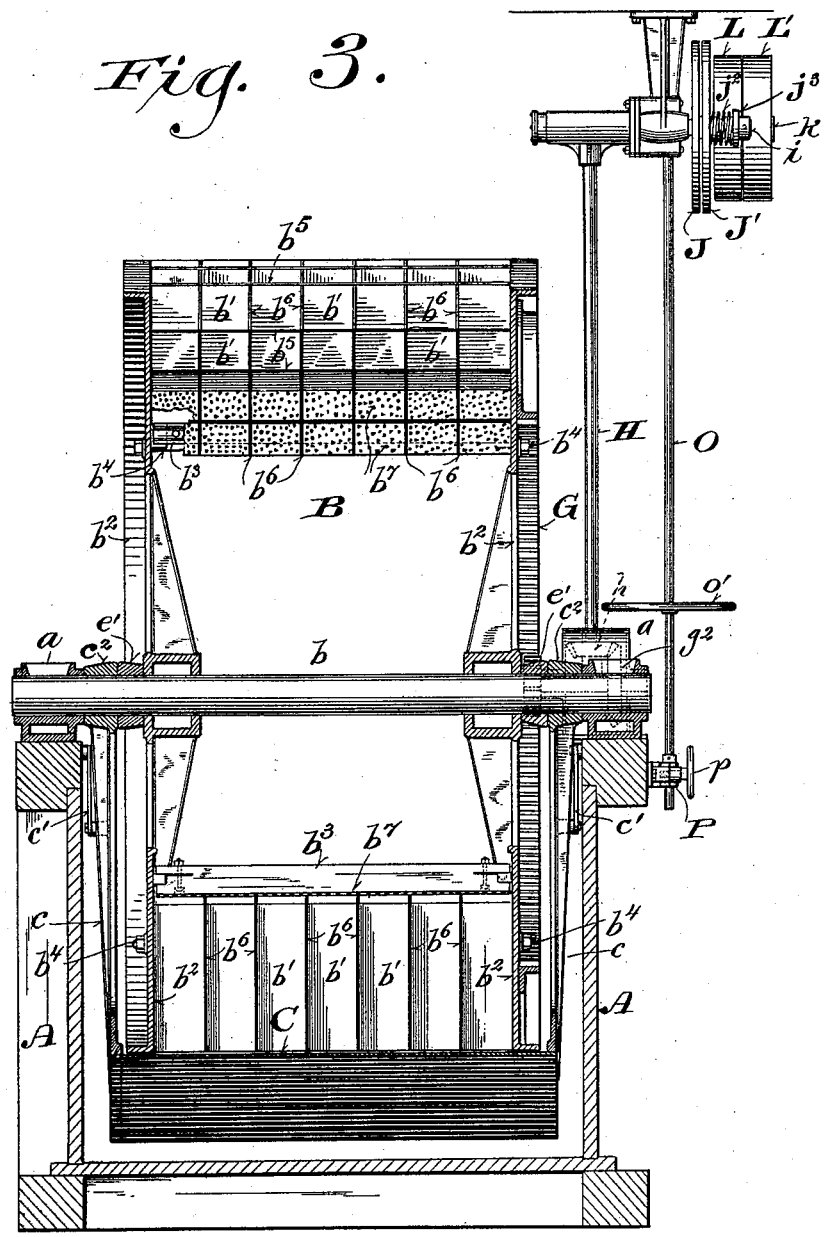

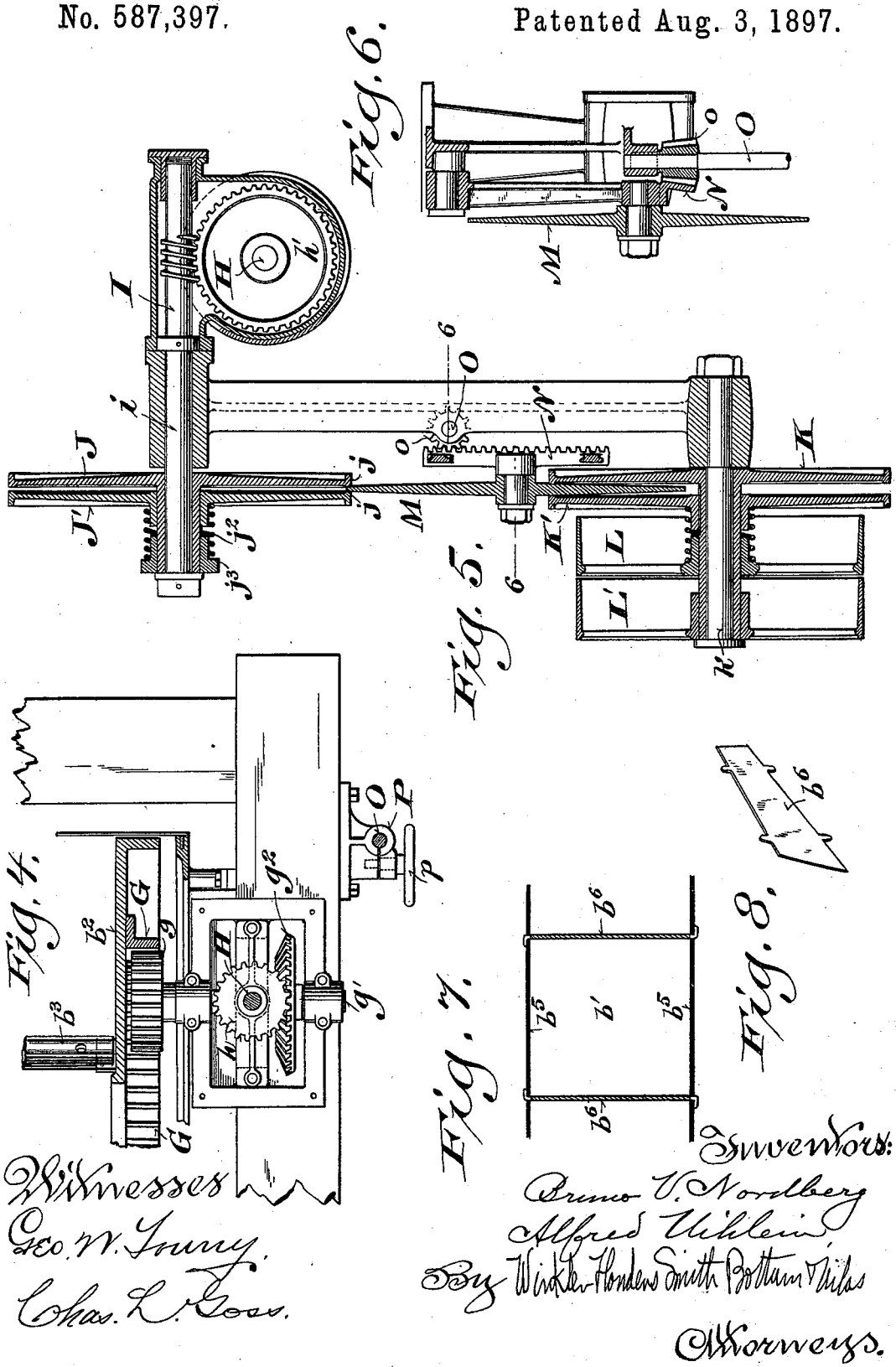

UNITED STATES PATENT OFFICE.

BRUNO V. NORDBERG AND ALFRED UIHLEIN, OF MILWAUKEE, WISCONSIN.

BOTTLE-WASHER.

SPECIFICATION forming part of Letters Patent No. 587,397, dated August 3, 1897.

Application filed June 28, 1894. Serial No. 515,933. (No model.)

*To all whom it may concern:*

Be it known that we, BRUNO V. NORDBERG and ALFRED UIHLEIN, of Milwaukee, in the county of Milwaukee and State of Wisconsin, have invented certain new and useful Improvements in Bottle-Soaking Apparatus; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of our invention is to facilitate cleansing bottles by repeatedly immersing and withdrawing them from a bath of water or suitable solution.

It consists, essentially, of a tank for holding a liquid, a wheel dipping on the lower side into said tank and provided around its rim with bottle-receptacles arranged at an inclination to its radii, and of certain other novel features in the construction and arrangement of the component parts of the apparatus hereinafter particularly described, and pointed out in the claims.

In the accompanying drawings like letters designate the same parts in the several figures.

Figure 1 is a side elevation of our improved apparatus, a portion of the front side of the tank being broken away to show the lower side of the wheel. Fig. 2 is a sectional view of the tank and wheel in a plane cutting the axis of the wheel at right angles. Fig. 3 is a vertical section on the line 3 3, Fig. 2. Fig. 4 is a horizontal section on the line 4 4, Fig. 1, showing on an enlarged scale a part of the driving connections of the soaking-wheel. Fig. 5 is a horizontal section on the line 5 5, Fig. 1, showing on an enlarged scale the variable-speed mechanism constituting a part of the driving connections of the soaking-wheel. Fig. 6 is a vertical section on the line 6 6, Fig. 5; and Figs. 7 and 8 are details on an enlarged scale illustrating the construction of the soaking-wheel.

Referring to Figs. 1, 2, and 3, A designates a tank open at the top.

B is a wheel supported by its shaft $b$ in boxes $a\,a$ on opposite sides of the tank, with its lower side dipping into the tank. It is formed or provided with bottle compartments or receptacles $b'\,b'$, arranged in a circular series around the rim and opening at their outer ends at the face of the wheel. This wheel is preferably constructed of two cast-iron end plates or side sections $b^2\,b^2$, formed with spokes and hubs, which are mounted on the shaft $b$ and connected crosswise with each other parallel with the shaft $b$ by wooden bars $b^3\,b^3$, split and clamped at their ends to lugs on the inner faces of the end plates, and by tie-rods $b^4$, and the bottle compartments or receptacles $b'\,b'$ are formed by plates $b^5\,b^5$, of metal or other suitable material, attached at their ends to the end plates or side sections $b^2\,b^2$ at a suitable distance from each other and inclined forwardly toward their outer edges from intersecting radii of the wheel, partitions $b^6$ dividing the spaces between the cross-plates $b^5$ and perforated plates or screens $b^7$, attached to the cross-bars $b^3$. The partitions $b^6$ are made of sheet metal, as shown in Fig. 8, and attached to the cross-plates $b^5$, as shown in Fig. 7, by means of tongues formed on their edges and inserted through slots in and bent over the opposite sides of said plates. A circular series of parallel horizontal rows of individual bottle compartments or receptacles is thus provided, the several receptacles or compartments being inclined forwardly toward their outer open ends with respect to the rotary movement of the wheel. The inner edges of the plates $b^5$ are attached to the rear sides of the cross-bars $b^3$ and terminate a little outside of the bottom plates or screens $b^7$ next following them. Ample drainage is thus afforded at the inner ends of the receptacles when they are inverted during their passage over the upper side of the wheel.

C is a curved guide corresponding in curvature with the periphery of the wheel B and supported close to the under side thereof concentrically therewith in the tank A by converging arms $c\,c$, meeting in hubs $c^2\,c^2$, which are loosely mounted on the shaft $b$ at opposite sides of the wheel. By this construction and arrangement the guide may be turned upwardly out of the tank for the purpose of cleansing or repairing it or for affording better access to the inside of the tank. It is held in proper working position in the tank by links $c'\,c'$ at opposite ends thereof.

D is an inclined shelf or leaf attached to the end of the tank on the descending side of the wheel, with its upper edge close to the adjacent edge of the guide C. Bottles are discharged from the soaking-wheel B upon said leaf, by which they are conducted into a tank (not shown) containing water or are otherwise disposed of.

E is a vertically-movable curved guard supported close to the face of the wheel on its descending side by converging arms $e\ e$, which are formed or connected with hubs $e'\ e'$, loosely mounted on the shaft $b$.

F is a rock-shaft supported in a horizontal position adjacent to the guard E in bearings on the end of the tank and provided at or near its ends with arms $f f$, which are connected by links $f'$ with the ends of said guard. This shaft is provided at one end with a lever handle or arm $f^2$, by means of which the guard E may be raised or lowered, so as to produce an opening just above the leaf D for the discharge of a row of bottles from the soaking-wheel or to close such opening. The arms $f f$ are formed with angular extensions having laterally-projecting pins or lugs $f^3$, which by engagement with the links $f'$ limit the upward movement of the guard E at the desired point.

G is a circular rack or internal gear attached to one side of the wheel, and $g$ is a pinion meshing therewith and mounted on a short horizontal shaft $g'$, parallel with shaft $b$ and provided with a bevel-gear $g^2$, as shown in Fig. 4.

H is a vertical shaft provided at its lower end with a bevel-gear $h$, meshing with the gear $g^2$, and at its upper end, as shown in Fig. 5, with a worm-gear $h'$, engaging with a worm I. Upon the worm-shaft $i$ are mounted side by side two friction-wheels J J′, having laterally-projecting rims $j j$. The wheel J is fixed upon said shaft, and the wheel J′ is loosely mounted upon its hub, so as to move freely endwise thereon. It is yieldingly pressed toward the wheel J by a coiled spring $j^2$, surrounding its hub on the outer side and bearing at its outer end against a flanged collar $j^3$, mounted upon the hub of wheel J.

K K′ designate a pair of similar friction-wheels mounted in like manner upon a shaft $k$, parallel with the shaft $i$, in the same planes with the wheels J J′.

L L′ are fixed and loose pulleys mounted upon the shaft $k$.

M is a tapering disk supported by a segment-gear N in a plane parallel with the planes of the friction-wheels J J′ and K K′, with its opposite edges projecting between the rims of said wheels. It is movable with the segment-gear toward and from the axes of said wheels.

O is a vertical shaft provided at its upper end with a pinion $o$, meshing with the segment-gear N, and at a convenient point below with a hand-wheel $o'$, by means of which it may be turned in either direction by the attendant or operator. At its lower end it is held in a split sleeve P, attached to the frame of tank A and provided with a hand-screw $p$, as shown in Fig. 4, for clamping it upon said shaft and locking the segment-gear N and disk M, carried thereby, in any desired position.

By means of the mechanism above described the speed of the soaking-wheel B may be varied as desired. We do not, however, claim herein the specific power-transmitting gearing shown and described for varying the speed of the soaking-wheel, nor do we wish to be understood as limiting ourselves to this specific gearing, as any other mechanism suitable for the purpose may be employed.

The tank A is provided at or near the bottom and ends with openings and covers $a'\ a'$, by means of which access is had to the tank below the wheel.

Our improved apparatus operates as follows: The tank being supplied with water or any suitable solution or liquid, the soaking-wheel A is set in motion, the guard E being lowered so as to rest at its lower edge upon the adjacent upper edge of the guide C. Bottles are inserted by the operator at the front side of the machine, on the ascending side of the soaking-wheel, in the receptacles $b'$, with their mouths inward, as shown in Fig. 2. The wheel is revolved slowly by the driving connections hereinbefore described, and as the bottles are carried down the descending side of the wheel into the tank they are held in the receptacles therein by the guard E and guide C. By means of the forward inclination of the receptacles or compartments $b'$ they are caused to dip bottom first into the liquid, and as they are completely immersed therein the liquid flows into and fills them. During their passage around the under side of the wheel in the tank they are held in place in said receptacles by the guide C, and as they are raised out of the liquid on the ascending side of the wheel in a partially-inverted position they are emptied and drained, the liquid flowing back into the tank through the perforated bottoms $b^7$ of the receptacles. The bottles are thus caused to pass through the tank once or any number of times, according to their condition, those in each row being immersed and filled and emptied and soaked, both outside and inside, at each revolution of the wheel during their passage through the tank. When they have been soaked sufficiently to thoroughly loosen impurities adhering thereto, the guard E is raised and they are discharged from the wheel upon the leaf D, by which they are conducted into a tank containing a liquid or other receptacle (not shown) or from which a row may be removed during the time required for another row of receptacles to be brought opposite the discharge-opening.

It is obvious that the size of the wheel and the number and arrangement of bottle-compartments, as well as other minor details of the apparatus, may be variously modified within the intended scope of our invention.

We claim—

1. In bottle-soaking apparatus the combination of a tank, a wheel dipping at its lower side into said tank, and provided around its rim with bottle-receptacles, and a curved guide suspended from the axis of the wheel so as to close the outer ends of said receptacles on the under side of the wheel, and to be turned upwardly out of the tank, substantially as and for the purposes set forth.

2. In bottle-soaking apparatus the combination of a tank, a rotary wheel dipping at its lower side into the same, and provided around its periphery with a series of bottle-receptacles open at their outer ends, and a vertically-movable guard arranged close to the face of the wheel on its descending side, substantially as and for the purposes set forth.

3. In a bottle-soaking apparatus the combination of a tank, a rotary wheel dipping at its lower side into said tank, and provided around its rim with bottle-receptacles inclined forwardly at their outer open ends to radii of the wheel, means of retaining bottles in said receptacles during their passage through said tank and a vertically-movable guard arranged on the descending side of the wheel just above the tank, substantially as and for the purposes set forth.

4. In bottle-soaking apparatus the combination of a tank, a rotary wheel dipping into it and provided around its rim with bottle-receptacles open at their outer ends, means of retaining bottles in said receptacles during their passage through said tank and a vertically-movable curved guard arranged on the descending side of the wheel above the tank, and pivotally connected with the axis of the wheel on each side thereof, substantially as and for the purposes set forth.

5. In a bottle-soaking apparatus the combination of a tank, a rotary wheel dipping at its lower side into said tank, and provided with a series of bottle-receptacles opening at their outer ends around the face of the wheel, means of retaining bottles in said receptacles during their passage through said tank, a vertically-movable curved guard arranged on the descending side of the wheel above the tank, and means of raising and limiting the elevation of said guard at a certain point, substantially as and for the purposes set forth.

6. In bottle-soaking apparatus the combination of a tank, a rotary wheel dipping into it, and provided with forwardly-inclined bottle-receptacles open at their outer ends around the face of the wheel, means of retaining bottles in said receptacles during their passage through said tank, a vertically-movable guard arranged on the descending side of said wheel above said tank, and a downwardly-inclined leaf below said guard, substantially as and for the purposes set forth.

7. In bottle-soaking apparatus the combination of a tank, a rotary wheel dipping on the under side into the same, and provided with forwardly-inclined bottle-receptacles open at their outer ends around the face of said wheel, a curved guide arranged to close the outer ends of said receptacles in the tank on the under side of the wheel, and a vertically-movable guard normally closing the outer ends of said receptacles on the descending side of the wheel above the tank, substantially as and for the purposes set forth.

In testimony that we claim the foregoing as our own we affix our signatures in presence of witnesses.

BRUNO V. NORDBERG.
ALFRED UIHLEIN.

Witnesses:
CHAS. L. GOSS,
M. L. EMERY,
EUGENE WUESTHOFF.